United States Patent [19]
Chikada et al.

[11] Patent Number: 5,446,630
[45] Date of Patent: Aug. 29, 1995

[54] OPTICAL-AXIS ADJUSTMENT CHECKER FOR AUTOMOTIVE HEADLAMPS

[75] Inventors: Akira Chikada, Isehara; Tadamitsu Kiryuu, Hadano, both of Japan

[73] Assignee: Ichikoh Industries, Ltd., Tokyo, Japan

[21] Appl. No.: 264,165

[22] Filed: Jun. 22, 1994

[30] Foreign Application Priority Data

Jun. 22, 1993 [JP] Japan ............................ 5-0033594 U
Aug. 24, 1993 [JP] Japan ................. 5-209531

[51] Int. Cl.⁶ .............................................. B60Q 1/06
[52] U.S. Cl. ...................... 362/66; 362/273; 362/428; 362/423; 362/424
[58] Field of Search ................... 362/66, 273, 61, 424, 362/423, 69, 270, 269, 418, 427, 428, 425, 419

[56] References Cited

U.S. PATENT DOCUMENTS

| | | | |
|---|---|---|---|
| 4,893,219 | 1/1990 | Lisak | 362/66 |
| 5,055,980 | 10/1991 | Mochizuki | 362/61 |
| 5,068,769 | 11/1991 | Umeda et al. | 362/61 |
| 5,091,829 | 2/1992 | Hendrischk | |
| 5,165,775 | 11/1992 | Lisak et al. | 362/66 |
| 5,351,170 | 9/1994 | Nagongast et al. | 362/66 |
| 5,388,036 | 2/1995 | Stoppelkamp | 362/66 |

*Primary Examiner*—Ira S. Lazarus
*Assistant Examiner*—Thomas M. Sember
*Attorney, Agent, or Firm*—Foley & Lardner

[57] ABSTRACT

The optical axis of the reflector is initially adjusted by operating the adjusting screw with the plate member held for a turning of the adjusting screw not to be transmitted to the plate member or with the ring member removed from the lamp housing for the turning of the adjusting screw not to be transmitted to the ring member. Therefore, after completion of the initial adjustment of the reflector optical axis, the index on the lamp housing can be easily put into coincidence with the reference point on the scale on the plate or ring member. Since the adjusting screw is isolated from the plate or ring member during the initial adjustment of the reflector optical axis, the optical axis of the reflector can be easily adjusted only by turning the adjusting screw. After completion of the initial optical-axis adjustment, the plate member is rendered to be slidable or the ring member is mounted to the lamp housing, thereby permitting to check how much the optical axis is to be readjusted, from a deviation between the index and the reference point on the scale.

9 Claims, 9 Drawing Sheets

OPTICAL-AXIS ADJUSTMENT CHECKER FOR AUTOMOTIVE HEADLAMPS

BACKGROUND OF THE INVENTION a) Field of the Invention

The present invention relates to a device for checking whether or not the optical axis of an automotive headlamp is correctly adjusted, and more specifically to an automotive headlamp optical-axis adjustment checker by which an index can be easily made to coincide with a reference point on a scale after the optical axis of the automotive headlamp is initially adjusted.

The automotive headlamps include generally two types: Movable-reflector type and movable-unit type. In a headlamp of the former type, a reflector to be adjusted is movably mounted on a lamp housing as a base member. In the latter-type headlamp, a lamp unit to be adjusted is movably mounted on a car body as a base member. For the simplicity of the explanation, it is assumed herein, unless otherwise specified, that the checker according to the present invention is to be installed on the lamp housing and the reflector is to be adjusted.

b) Description of the Prior Art

If directed too upward, the light beam from the automotive headlamp will dazzle the driver of a car running in the opposite lane, possibly causing a danger. On the contrary, if directed too downward, the headlamp will not provide a sufficient illumination of the road surface in front of the car for assurance of safe drive. Further, if the optical axis of the light beam from the headlamp is greatly shifted horizontally, the road surface in front of the car will not be appropriately illuminated, also causing a danger. To avoid such dangers, the optical axis of the automotive headlamp has to be correctly adjusted. Therefore, the automotive headlamp is provided with mechanisms fixed on the car body to adjust the optical axis a little vertically and horizontally.

One of the automotive headlamps of the above type is known from the disclosure in the U.S. Pat. No. 5,055,980. In this headlamp, a reflector is pivotably mounted on a lamp housing by means of a pivot bearing, a lamp bulb is provided in the reflector, and the reflector and lamp housing have mounted therein mechanism for adjusting the optical axis of the headlamp vertically and a one for adjusting the optical axis horizontally.

Such an optical-axis adjusting mechanism comprises an adjusting screw mounted in the lamp housing rotatably but not axially movably, etc. By operating the adjusting screw of the above-mentioned vertical optical-axis adjusting mechanism or that of the horizontal optical-axis adjusting mechanism, the reflector is pivoted vertically or horizontally in relation to the lamp housing for vertical or horizontal adjustment of the optical axis.

The direction of the headlamp optical axis must be adjusted elaborately with a high accuracy and can be adjusted only by a specialist using a special equipment. Therefore, before shipment of a car from the automobile manufacturing works or when the headlamps are equipped on a car at a service shop, the optical axes of the headlamps are initially adjusted by the specialist there with the special equipment.

After the optical axes of the headlamps of a car are initially adjusted, it becomes necessary for some reason to readjust the optical axes. The optical-axis readjustment is done while ascertaining, by using an optical-axis adjustment checker, how much the optical axis is to be adjusted.

Various optical-axis adjustment checking devices have been proposed so far. One of such devices is disclosed in the U.S. Pat. No. 5,068,769. The device comprises a pointer so mounted on an adjusting screw as to be movable axially of the adjusting screw as the latter is turned, and a scale plate so mounted on a lamp housing as to be movable axially of the screw.

When the adjusting screw of the optical-axis adjustment checking device is turned to pivot the reflector vertically or horizontally in relation to the lamp housing for vertical or horizontal adjustment of the optical axis, the pointer is moved axially of the adjusting screw as the latter is turned. This movement of the pointer is readable as a deviation between an index on the pointer and a mating-index on the scale plate. Namely, it is a required mount of optical-axis adjustment. Thus, the optical axis of the headlamp, that is, of the reflector can be adjusted based on the thus-read or necessary amount of optical-axis adjustment.

In the above-mentioned optical-axis adjustment checking device, however, since the pointer is so mounted on the adjusting screw as to be moved axially of the adjusting screw as the latter is turned, turning the adjusting screw for initial adjustment of the reflector optical axis causes the pointer to be moved axially of the adjusting screw. Therefore, after completion of that initial adjustment, it is necessary to make the index on the pointer coincide with the "0" or mating-index on the scale plate by moving the scale plate axially of the adjusting screw.

Also, the above-mentioned device has a first and second gears in mesh with each other and a spring which normally forces the second gear for engagement with the second gear. So, the initial adjustment of reflector optical axis has to be done by turning the adjusting screw while keeping the first and second gears disengaged from each other, by pressing the second gear against the force of the spring, so that the second gear will not be rotated.

SUMMARY OF THE INVENTION

The present invention has an object to provide an optical-axis adjustment checker for automotive headlamps, by which an index can be easily made to coincide with a reference mark on a scale plate.

According to an aspect of the present invention, the headlamp optical-axis adjustment checker comprises a plate member having a scale or similar marking provided thereon, means of mounting the plate member on a lamp housing of the headlamp slidably in one direction, mechanism for converting the turning of the adjusting screw into a sliding of the plate member, and a means of holding the plate member so that the turning of the adjusting screw is not transmitted to the plate member via the converting mechanism.

The optical axis of the reflector can be initially adjusted by turning the adjusting screw with the plate member not slid since the plate member is held by the holding means so that the turning of the adjusting screw is not transmitted to the plate member via the converting mechanism. Therefore, after completion of the initial adjustment of the reflector optical axis, the index can be easily put into coincidence with the reference marking on the scale.

After the plate member is returned to a position where it is slidable, following the initial adjustment of the reflector optical axis, it is possible to ascertain, based on the deviation between the index and reference mark, how much the reflector optical axis is to be adjusted.

According to another aspect of the present invention, the optical-axis adjustment checker comprises a ring member having a scale or marking provided thereon, means of mounting the ring member on a lamp housing of the headlamp rotatably and removably, and a mechanism for converting a turning of the adjusting screw into a rotation of the ring member.

The optical axis of the reflector can be initially adjusted by turning the adjusting screw with the ring member not rotated since the ring member is detached from the lamp housing so that the turning of the adjusting screw is not transmitted to the ring member via the converting mechanism. Therefore, after completion of the initial adjustment of the reflector optical axis, the coincidence of the index with the reference mark on the scale can be made very easily.

After the ring member is returned to a position where it is rotatable, following the initial adjustment of the reflector optical axis, it is possible to check the necessary adjustment of the reflector optical axis, based on the deviation between the index and reference mark.

The present invention will be better understood from the ensuing description made, by way of example, of the embodiments of the automotive headlamp optical-axis adjustment checker according to the present invention with reference to the drawings.

DETAILED DESCRIPTION OF THE PREFERRED EMBODIMENTS

Figure 1:
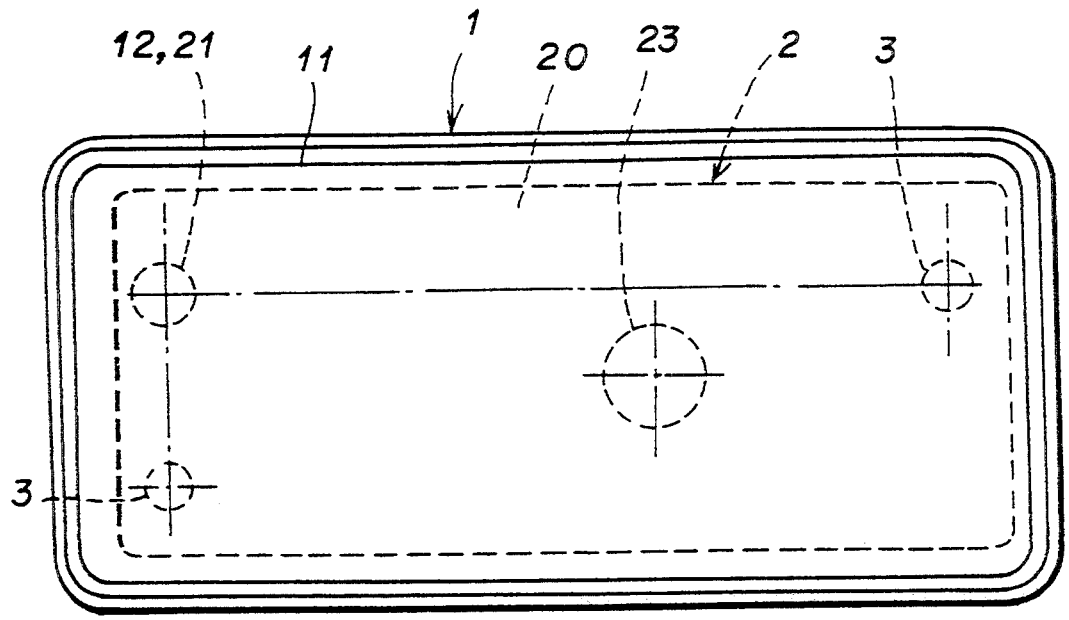
FIG. 1 is a front view of a movable-reflector type automotive headlamp equipped with an embodiment of the automotive headlamp optical-axis adjustment checker according to the present invention.
Figure 2:
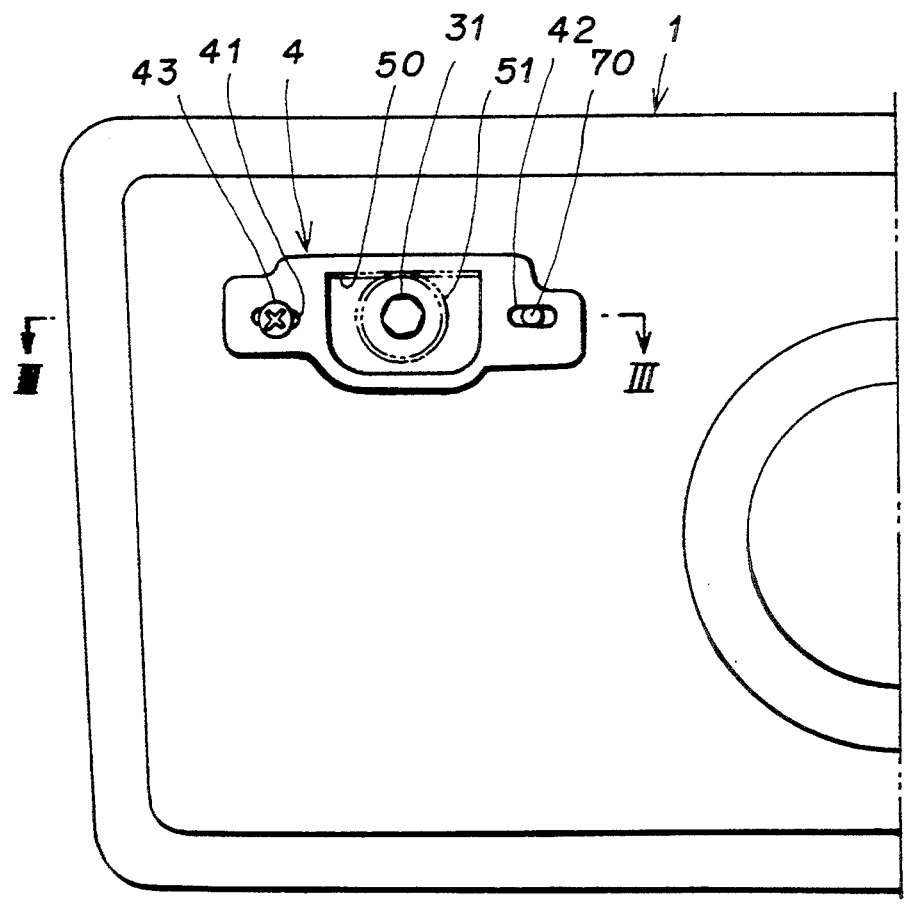
FIG. 2 is a partial rear view of the checker in FIG. 1.
Figure 3:
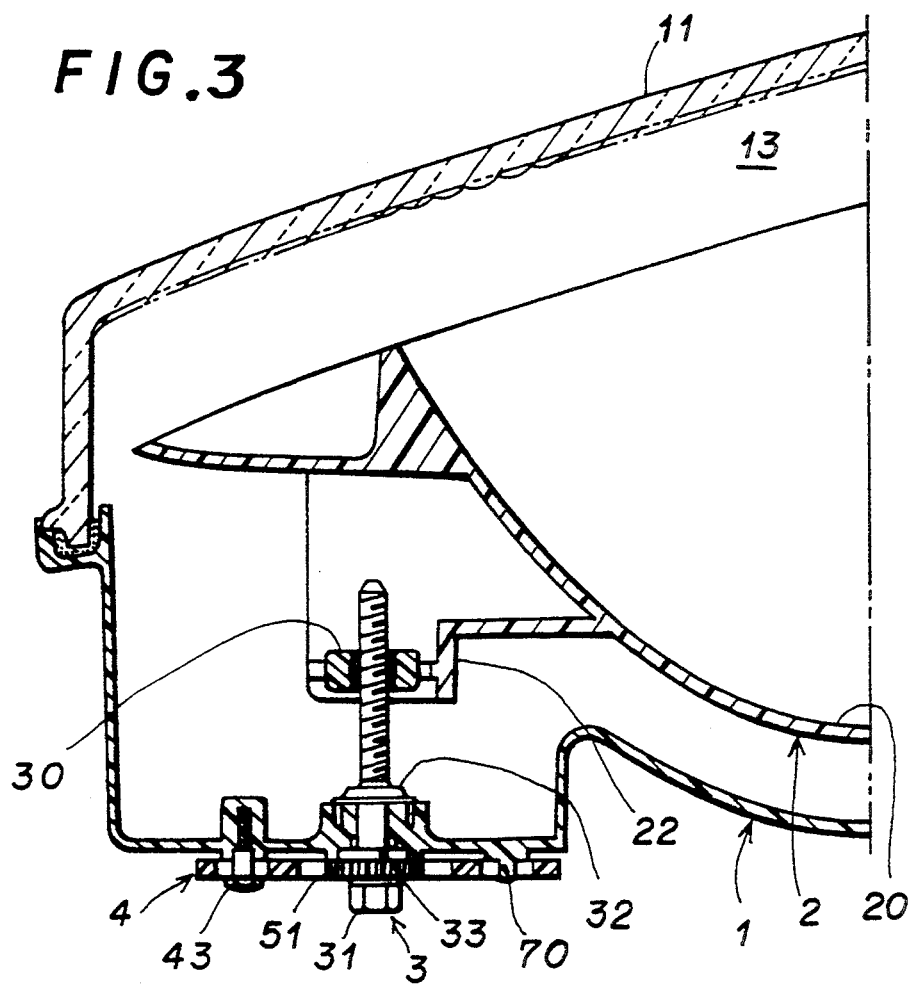
FIG. 3 is a sectional view taken along the line III—III in FIG. 2.

FIGS. 1 through to 9 show together the first embodiment of the automotive headlamp optical-axis adjustment checker according to the present invention. The headlamp in this embodiment is of the movable-reflector type.

As shown in Figures, the automotive headlamp has a lamp housing 1. The lamp housing 1 has a lens 11 attached in the front opening thereof as sealed with a hot melt or the like. The lamp housing 1 and lens 11 define a bulb space 13 between them.

There is provided a reflector 2 inside the bulb space 13. The reflector 2 is pivotably mounted on the lamp housing 1 by means of a spherically concave bearing 12 and ball-ended shaft 21, shown in the upper left portion of FIG. 1. The reflector 2 has a reflecting surface 20, like a paraboloid of revolution, for example, provided on the front side thereof (opposite to the lens 11). A lamp bulb 23 is disposed on the side of the reflecting surface 20 of the reflector 2.

As shown in the upper right and lower left portions of FIG. 1, a mechanism 3 for adjusting the optical axis horizontally and a one 3 for adjusting the optical axis vertically are installed in the lamp housing 1 and reflector 2. The optical-axis adjusting mechanism 3 comprises a screw mount 30 and adjusting screw 31.

The adjusting screw 31 is inserted from outside (from outside the bulb space 13) into the bulb space 13 through a through-hole 15 formed in a fixture 14 of the lamp housing 1, and installed to the fixture 14 with a fastening member such as a push nut or the like and a flange 33 thereof rotatably but immovably axially thereof. An O-ring 16 is provided on the adjusting screw 31 to keep a watertightness between the screw 31 and the inner circumference of the through-hole 15.

The screw mount 30 is a pivot, pivot holder or the like fixed to a fixture 22 of the reflector 2 unrotatably and immovably axially of the adjusting screw 31. The adjusting screw 31 is mounted as driven into the screw mount 30, to build the optical-axis adjusting mechanism 3.

When the adjusting screw 31 of the optical-axis adjusting mechanism 3 shown in the upper right portion of FIG. 1 is turned, the reflector 2 is pivoted horizontally in relation to the lamp housing 1 about a line through the bearing 12 and ball-ended shaft 21 shown in the upper left portion of FIG. 1 and the optical-axis adjusting mechanism 3 shown in the lower left portion. As the adjusting screw 31 of the optical-axis adjusting mechanism 3 shown in the lower left portion of FIG. 1 is turned, the reflector 2 is pivoted vertically in relation to the lamp housing 1 about a line through the bearing 12 and ball-ended shaft 21 in the upper left portion of FIG. 1 and the optical-axis adjusting mechanism 3 shown in the upper right portion. The optical axis is thus adjusted.

Figure 5:
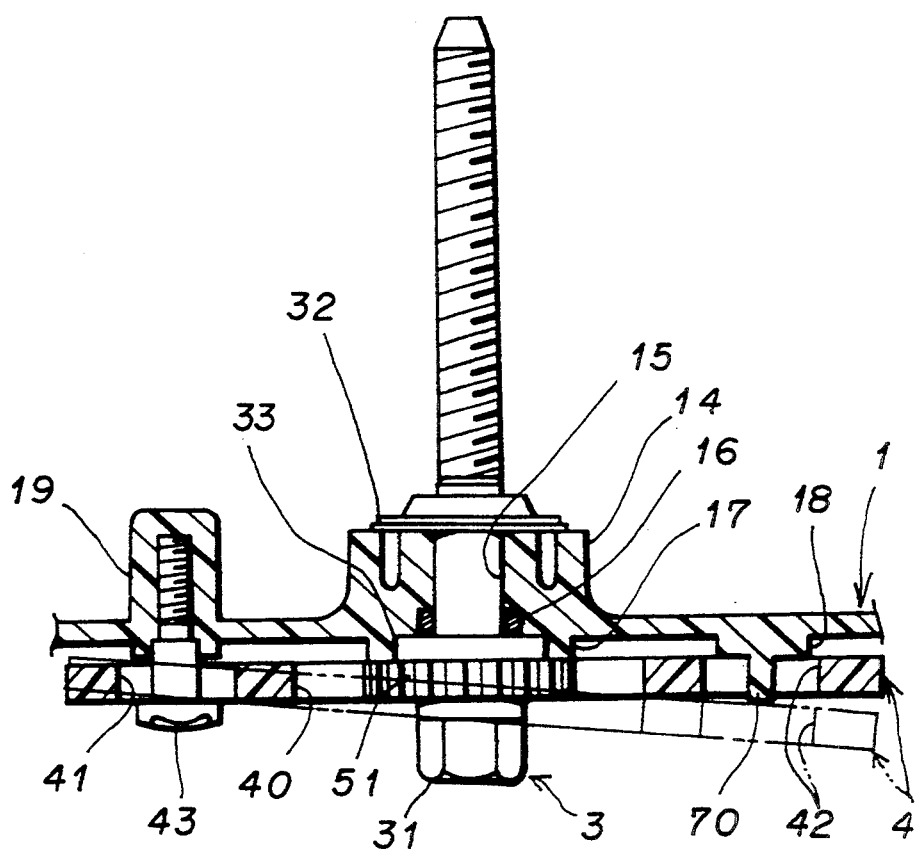
FIG. 5 is a sectional view taken along the line V—V in FIG. 4.
Figure 6:
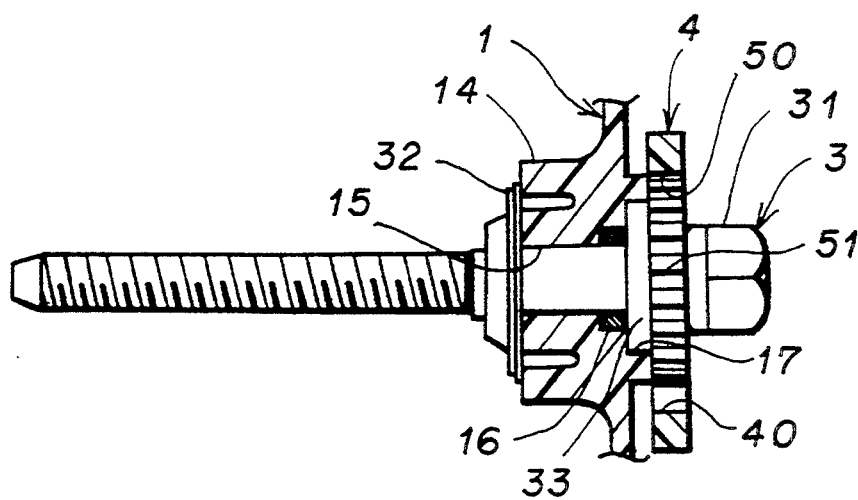
FIG. 6 is a sectional view taken along the line VI—VI in FIG. 4.
Figure 7:
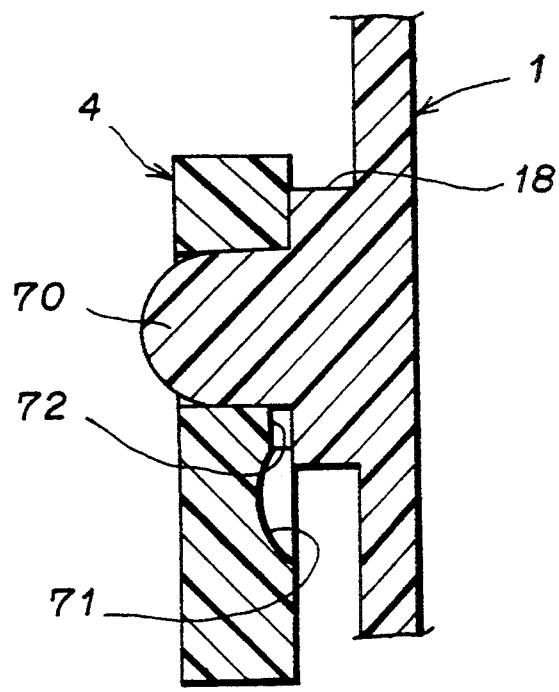
FIG. 7 is a sectional view taken along the line VII—VII in FIG. 4.

As shown in FIGS. 5 and 6, there is formed integrally with the lamp housing 2 a ring member 17 which surrounds the flange 33 of the adjusting screw 31.

In Figures, the reference numeral 4 indicates a generally rectangular plate member made of, for example, a resilient material such as synthetic resin, metal sheet or the like. The plate member 4 is slidably mounted on the lamp housing 1.

More particularly, the plate member 4 has formed at both end portions thereof elongated circular guide holes 41 and 42 of which the long axes are directed longitudinally thereof (in the sliding direction of the plate member 4). As shown in FIG. 5, the lamp housing 1 has a support projection 18 and a mounting boss 19 formed integrally therewith as shown in the upper right portion of FIG. 1. The support projection 18 has a small cylindrical guide pin 70 formed integrally therewith nearly at the center of the end face thereof.

A fixing screw 43 is inserted in the left-hand guide hole 41 in the plate member 4. The fixing screw 43 is engaged at the threadless portion thereof in the guide hole 41 and driven from outside into the mounting boss 19. On the other hand, the guide pin 70 is engaged in the right-hand guide hole 42 in the plate member 4. The plate member 4 is held at the front side thereof under the head of the fixing screw 43 while being held at the rear side thereof by the outer face of the support projection 18.

Thus, the plate member 4 is slidably mounted on the lamp housing 1 with the fixing screw 43, guide pin 70, guide holes 41 and 42 and so forth. Also, the plate member 4 is installed pivotably about the fixing screw 43. Owing to its resilience, the plate member 4 is tiltable at the right end portion thereof about the fixing screw 43 in the projecting direction of the guide pin 70 as indicated with a two-dot chain line in FIG. 5.

More specifically, since the outwardly projecting height of the mounting boss 19 is smaller than that of the support projection 18, the plate member 4 is tiltable at the left end portion thereof toward the mounting boss 19 as indicated with the two-dot chain line in FIG. 5, so that the plate member 4 can be tilted in the projecting direction of the guide pin 70.

Figure 4:
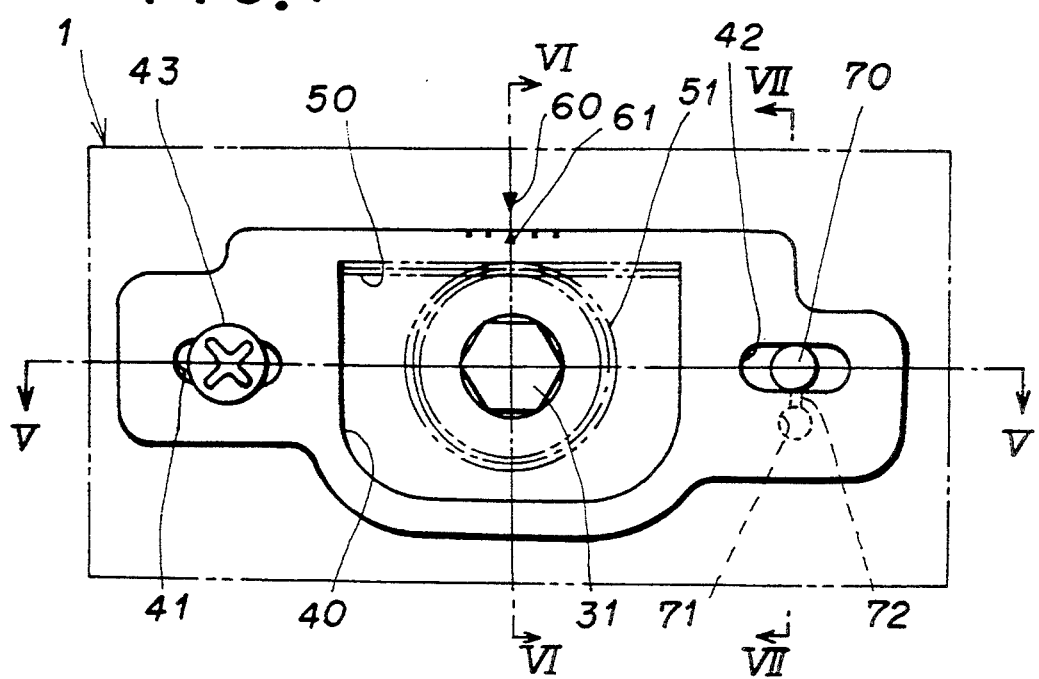
FIG. 4 is a partial rear view showing that the plate member is slidable.

In Figures, the reference numerals 50 and 51 indicate a rack and pinion, respectively, formed on the plate member 4 and adjusting screw 31, respectively. They form together a movement converting mechanism. The rack 50 is formed along the upper edge of an opening 40 formed in the center of the plate member 4. The pinion 51 is fixed between the hexagonal head and flange 33 of the adjusting screw 31. When brought into mesh with each other as shown in FIG. 4, the rack 50 and pinion 51 work together to convert the turning of the adjusting screw 31 into a sliding of the plate member 4. Also, when the rack 5 is not in mesh with the rack 50 as shown in FIG. 8, a turning of the adjusting screw 31 is not transmitted to the plate member 4.

As shown in FIGS. 4, 7, 8 and 9, the plate member 4 has formed on the rear side thereof a small spherical concavity 71 correspondingly to the guide pin 70. The guide pin 70 and concavity 71 serve together to hold the plate member 4 in a position where the turning of the adjusting screw 31 is not transmitted to the plate member 4 via the pinion 51 and rack 50. More particularly, the plate member 4 can be held in the above-mentioned free position by tilting the right end portion of the plate member 4 as indicated with the two-dot chain line in FIG. 5, rotating the right-hand end portion of the thus-tilted plate member counterclockwise on FIG. 4 about the fixing screw 43 and then fitting the guide pin 70 into the concavity 71.

There is formed on the rear side of the plate member 4 between the concavity 71 and the guide hole 42 a guide recess 72 partially forming a circle taking the fixing screw 43 as the center thereof.

Figure 8:
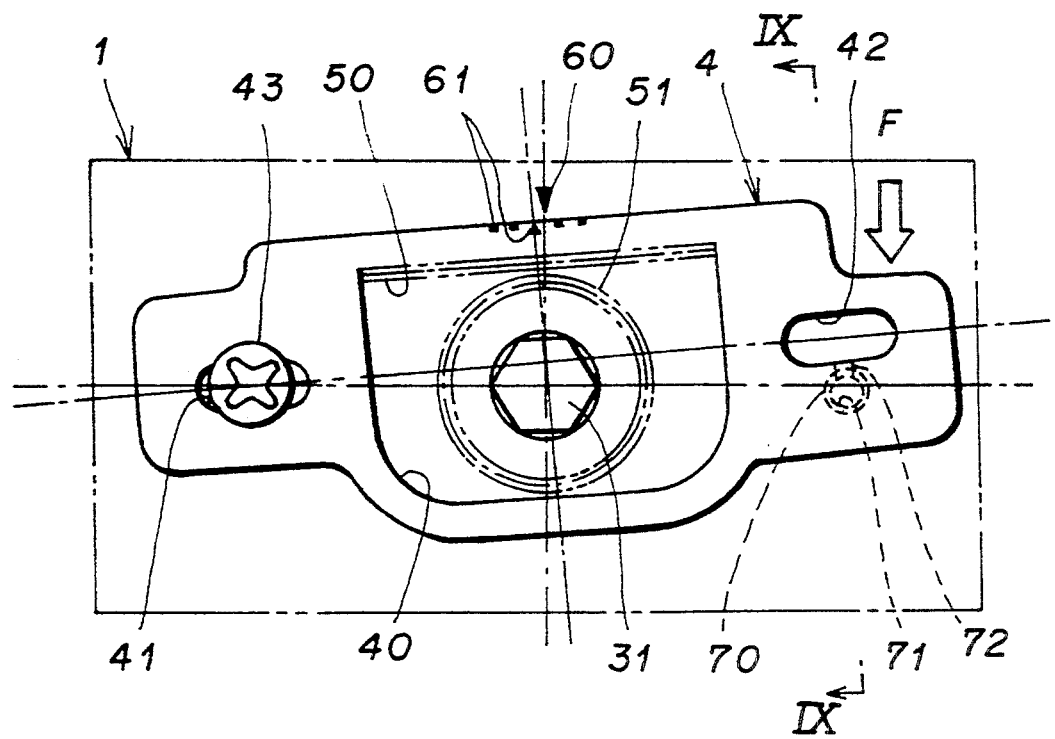
FIG. 8 is a partial rear view showing that the plate member is so held that a turning of the adjusting screw is not transmitted to the plate member via the converting mechanism.
Figure 9:
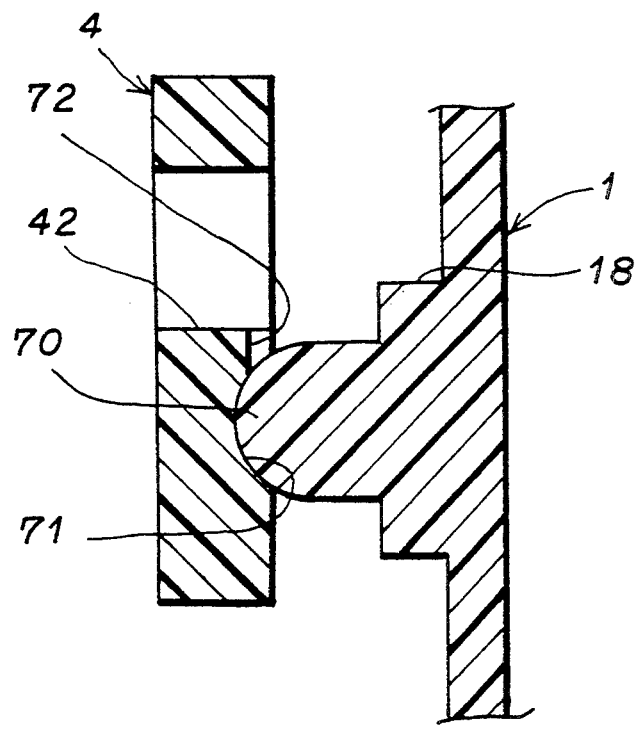
FIG. 9 is a sectional view taken along the line IX—IX in FIG. 8.
Figure 10:
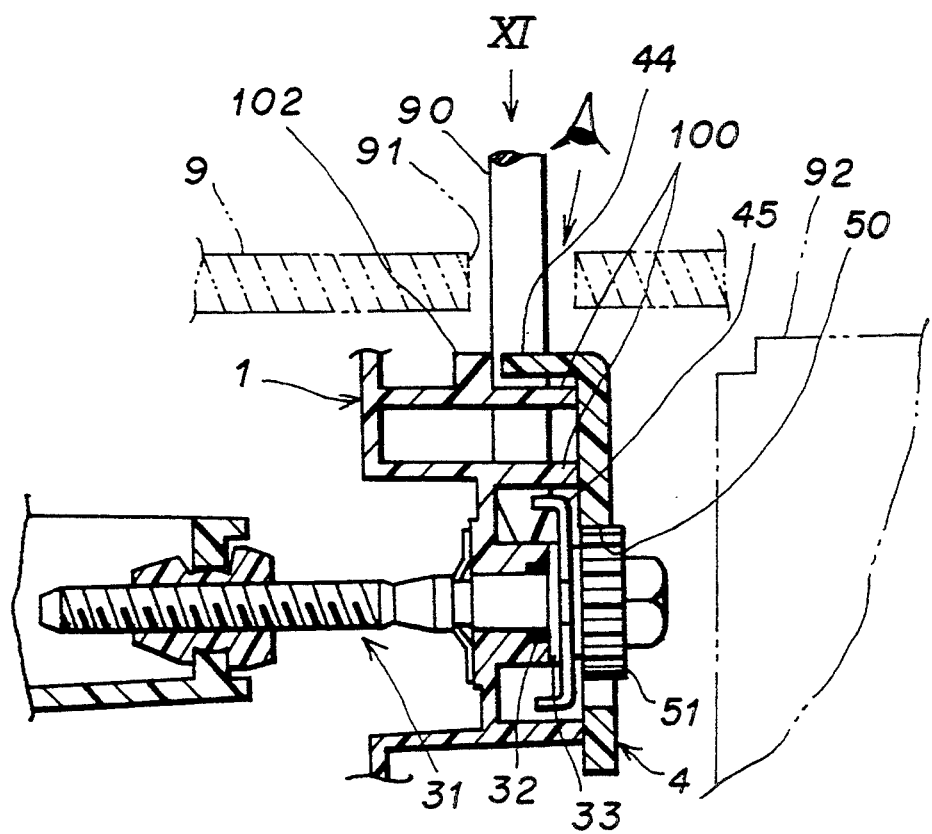
FIG. 10 is an axial sectional view of the essential parts of a second embodiment of the optical-axis adjustment checker according to the present invention, equipped on a movable-reflector type automotive headlamp.
Figure 11:
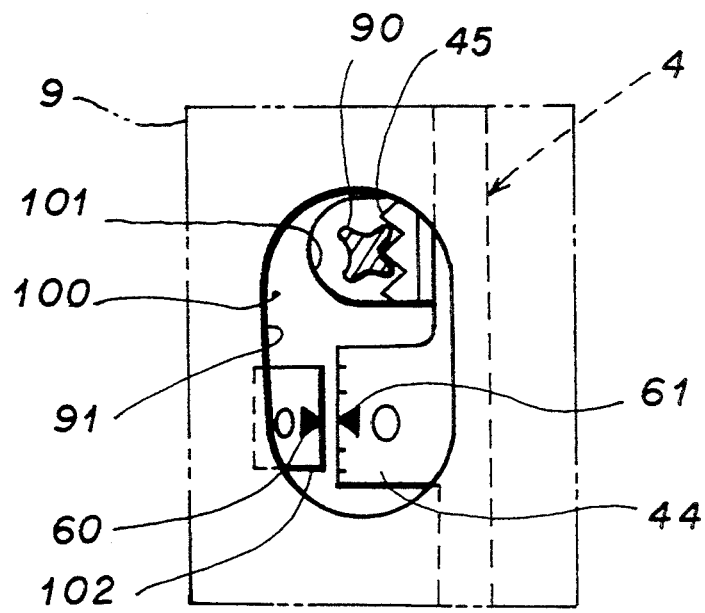
FIG. 11 is a view from the arrow XI in FIG. 10.

As shown in FIGS. 4 and 8, the lamp housing 1 has an index 60 marked thereon and the plate member 4 has a scale 61 marked in the central portion along the front upper edge thereof. The central division of the scale 61 is the reference mark, for example, "0" position. The sliding amount of the plate member 4 moved as the adjusting screw 31 is rotated, namely, the deviation between the index 60 marked on the lamp housing 1 and the reference mark on the scale 61 marked on the plate member 4, is to be read as a measure for required optical-axis adjustment. The index 60 and scale 61 are so marked as to be put into coincidence with each other when the guide pin 70 is fitted into the concavity 71.

The optical-axis adjustment checker according to this embodiment of the present invention is constructed as having been described in the foregoing, and functions as will be described below:

For the initial adjustment of the optical axis of the reflector 2, the right end portion of the plate member 4 is first tilted in the projecting direction of the guide pin 70 and the plate member 4 thus tilted is rotated counterclockwise to fit the guide pin 70 of the lamp housing 1 into the concavity 71 of the plate member 4. Thus, the rack 50 and pinion 51 are disengaged from each other and held in this state. That is to say, since the turning of the adjusting screw 31 is not transmitted to the plate member 4 during the initial optical-axis adjustment of the reflector 2, the optical axis of the reflector 2 can be easily adjusted simply by turning the adjusting screw 31. On the other hand, the reference mark ("0" point) on the scale is made to coincide with the index 60.

After completion of the initial optical-axis adjustment of the reflector 2, the plate member 4 is pushed in the direction of arrow F (clockwise direction) in FIG. 8 about the fixing screw 43 to bring the rack 50 and pinion 51 into mesh with each other and fit the guide pin 70 into the guide hole 42. Then, the index 60 has already been put into coincidence with the "0" point on the scale 61 by fitting the guide pin 70 into the concavity 71.

Next, when the adjusting screw 31 is turned to readjust the optical axis of the reflector 2, the turning of the adjusting screw 31 is converted into a sliding of the plate member 4 via the rack 50 and pinion 51, and the plate member 4 is slid longitudinally of the guide holes 41 and 42 as guided by the guide pin 70 and fixing screw 43. The sliding of the plate member 4 is indicated as a relative deviation between the index 60 and reference mark on the scale 61 and as a required adjustment of the optical axis.

FIGS. 10 through 13 show together the second embodiment of the optical-axis adjustment checker according to the present invention. This second embodiment is a variant of the aforementioned first embodiment. In these Figures, the same elements as in FIGS. 1 through 9 are indicated with the same reference numerals.

In Figures, the reference numeral 9 indicates a part of a car body, that is, the under-apron forming the concavity of the car body where the automotive headlamp is housed. The under-apron 9 has an elongated through-hole 91 in a portion thereof generally perpendicular the adjusting screw 31 and where the adjusting screw 31 and plate member 4 are located. The through-hole 91 is intended for the worker to turn the adjusting screw 31 and watch the index 60 and scale 61 during optical-axis adjustment, both generally perpendicularly to the axis of the adjusting screw 31.

The reference numeral 92 indicates a battery, window washing water reservoir or the like disposed adjacently to the rear of the automotive headlamp.

A crown gear 45 is disposed as fixed between the flange 33 of the adjusting screw 31 and the pinion 51.

The lamp housing 1 has two guides 100, upper and lower, formed intergally therewith as projected opposite to the through-hole 91. Each of the two guides 100 has a through-hole 101 formed in a portion thereof corresponding to the crown gear 45. Thus, a tool 90 (for example, a Phillips type screwdriver) can be introduced through the through-holes 91 and 101 and engaged with the crown gear 45. The adjusting screw 31 can be turned by the tool 90 from a direction generally perpendicular to the axis of the adjusting screw 31 itself.

Figure 12:
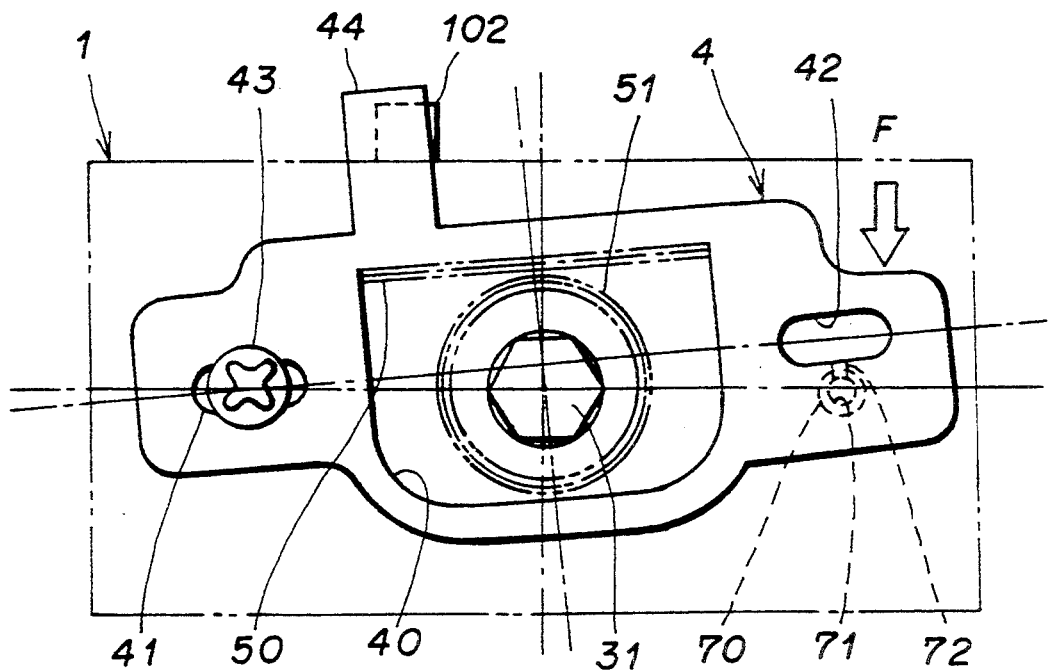
FIG. 12 is a partial rear view showing that the plate member is so held that a turning of the adjusting screw is not transmitted to the plate member via the converting mechanism.
Figure 13:
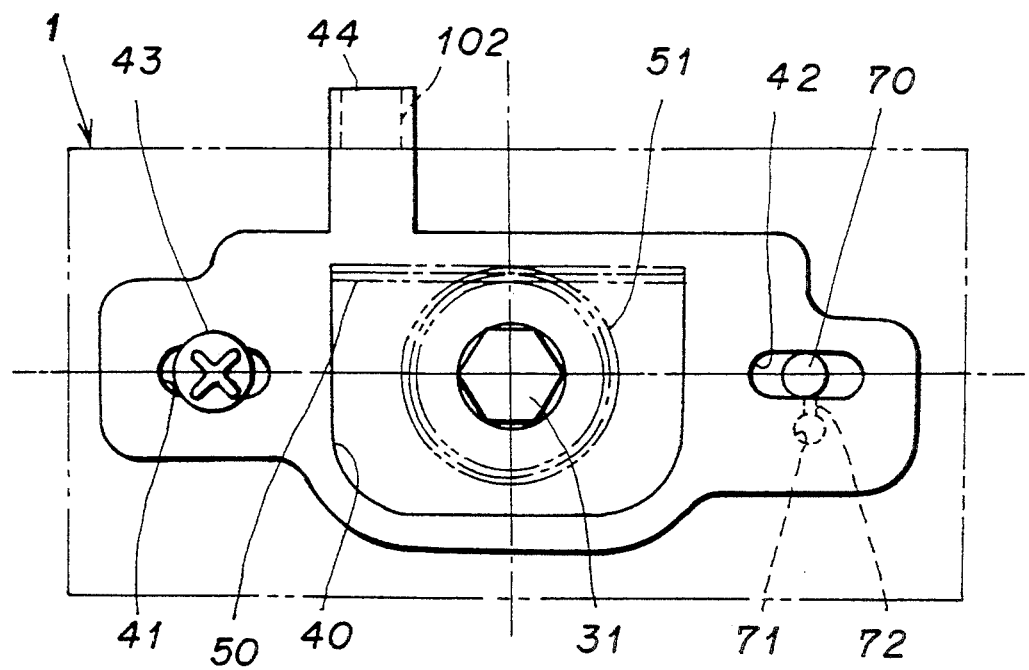
FIG. 13 is a partial rear view showing that the plate member is slidable.

A projection 102 is formed integrally on the edge of the through-hole 101 of the upper guide 100. The plate member 4 has an integral bend 44 opposite to the projection 102. The projection 102 has an index 60 marked thereon and the bend 44 has also a scale 61 marked thereon. The index 60 and scale 61 are visible through-hole 91. The bend 44 is located in such a position as not to close the through-hole 101 when the plate member 4 is held in a position where the turning of the adjusting screw 31 is not transmitted to the plate member 4 as shown in FIG. 12.

The optical-axis adjustment checker according to this embodiment of the present invention is constructed as having been described in the foregoing. Even if a battery, window washing water reservoir or the like 92 is located behind the checker accroding to the present invention, the optical axis can be adjusted and the adjustment can be checked from a direction generally perpendicular to the axis of the adjusting screw 31.

Figure 14:
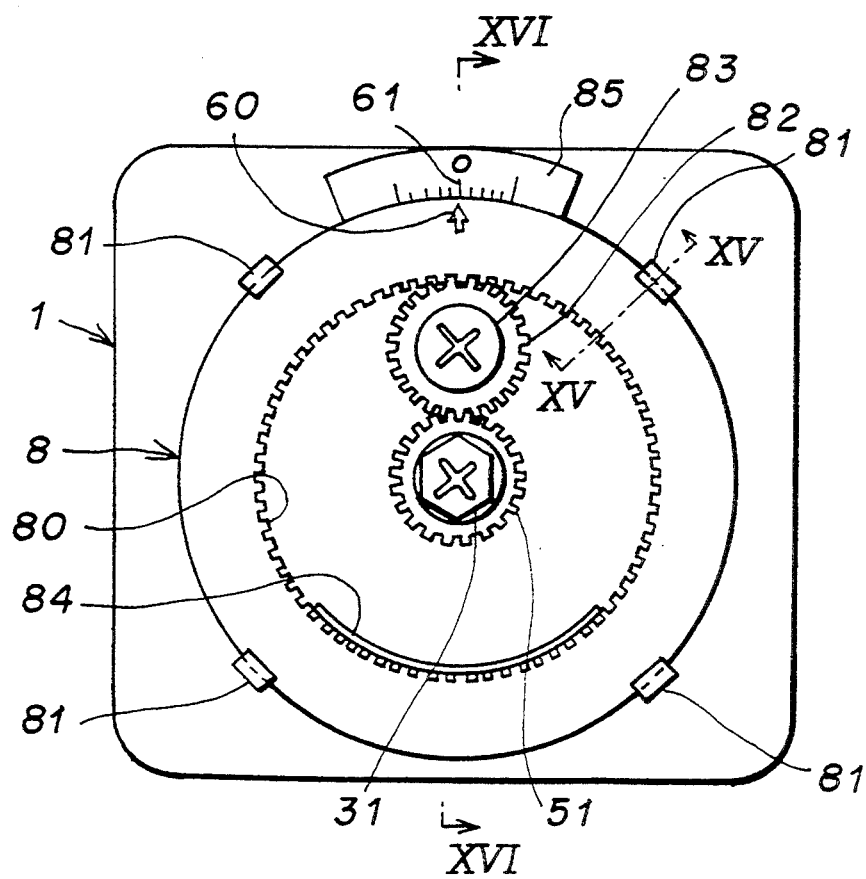
FIG. 14 is a partial rear view of the essential parts of a third embodiment of the optical-axis adjustment checker according to the present invention, equipped on a movable-reflector type automotive headlamp.
Figure 15:
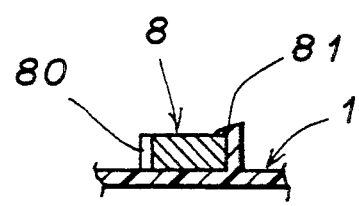
FIG. 15 is a sectional view taken along the line XV—XV in FIG. 14.
Figure 16:
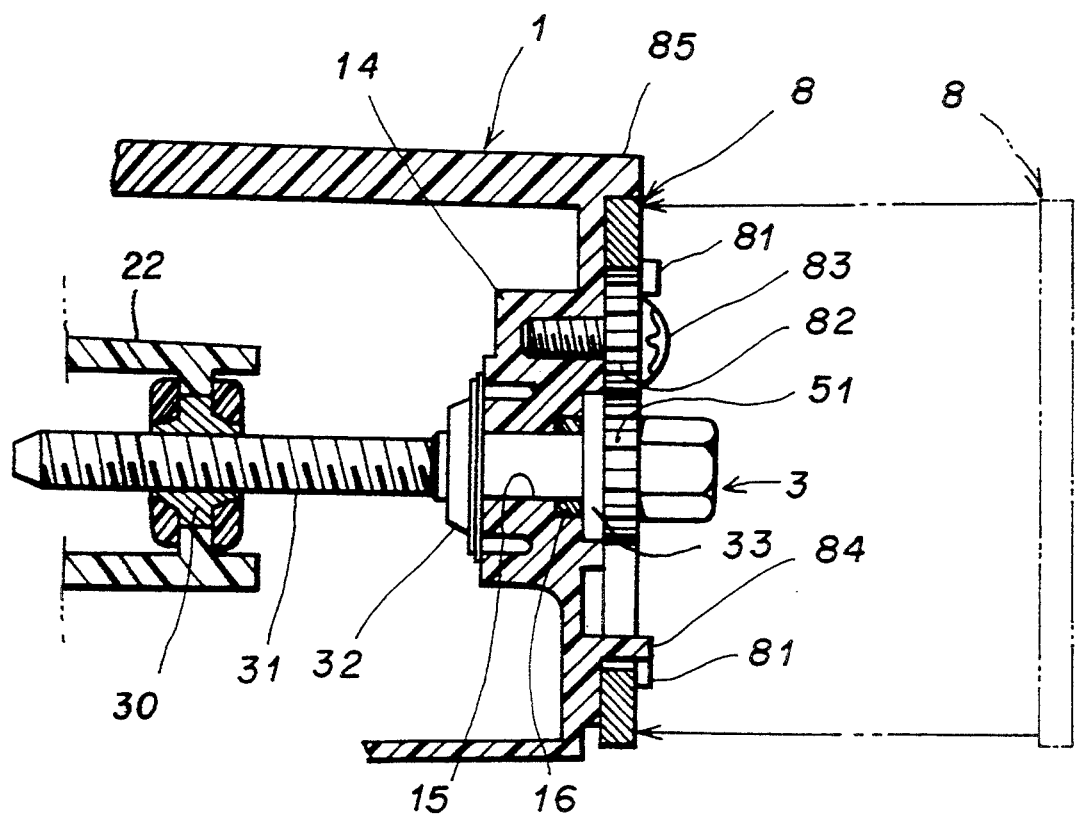
FIG. 16 is a sectional view taken along the line XVI—XVI in FIG. 14.

FIGS. 14 through 16 show together the third embodiment of the optical-axis adjustment checker according to the present invention. In these Figures, the same elements as in FIGS. 1 through 9 are indicated with the same reference numerals.

In Figures, the reference numeral 8 indicates a ring member made of, for example, a metal sheet. The ring member 8 is mounted rotatably and removably on the lamp housing 1 with a plurality, for example, four, of resilient hooks 81, guide projection 84 and a projection 85.

The four resilient hooks 81 are fixed to the lamp housing 1 as regularly spaced on the outer circumference of the ring member 8. The resilient hooks 81 have each an inwardly directed pawl.

The guide projection 84 is formed integrally with the lamp housing 1 along the lower inner circumference of the ring member 8, and extends over about one quarter of the inner circumference of the ring member 8.

The projection 85 is formed integrally with the lamp housing 1 along the upper outer circumference of the ring member 8.

As seen, inner teeth 80 are formed along the inner circumference of the ring member 8, and an intermediate gear 82 is rotatably mounted on the lamp housing 1 with a screw 83. The intermediate gear 82 is in mesh with the pinion 51 of the adjusting screw 31. The inner teeth 80 of the ring member 8 are set in mesh with the intermediate gear 82 to transmit the turning of the adjusting screw 31 via the intermediate gear 82 to the ring member 8 which in turn will be rotated.

The ring member 8 has an index 60 marked thereon near the outer circumference thereof, and a scale 61 is marked on the top of the projection 85.

The optical-axis adjustment checker according to this embodiment of the present invention is constructed as having been described in the foregoing, and functions as will be described below:

For the initial adjustment of the optical axis of the reflector 2, the ring member 8 is first removed from the lamp housing 1 as indicated with the two-dot chain line in FIG. 16 and it is provisionally put aside. Namely, the inner teeth 80 of the ring member 8 are disengaged from the intermediate gear 82. Since the turning of the adjusting screw 31 is not transmitted to the ring member 8 during the initial optical-axis adjustment of the reflector 2, the optical axis of the relector 2 can be initially adjusted only by operating the adjusting screw 31.

After completion of the initial optical-axis adjustment of the reflector 2, the ring member 8 is pressed in the direction of the arrows with two-dot chain lines in FIG. 16 while the index 60 is being made to coincide with the reference point "0" on the scale 61, and thus the ring member 8 is secured rotatably and removably with the resilient hooks 81, guide projection 84 and projection 85. Also, the inner teeth 80 of the ring member 8 are brought into mesh with the intermediate gear 82. Thus, the index 60 marked on the ring member 8 can be easily made to coincide with the reference point on the scale 61 marked on the lamp housing 1.

Then, the adjusting screw 31 is turned to readjust the optical axis of the reflector 2. The turning of the adjusting screw 31 is transmitted to the ring member 8 which in turn will be rotated. The turning of the ring member 8 is indicated as a deviation between the index 60 and the reference point on the scale 61. The deviation thus read is a required amount of optical-axis adjustment.

Figure 17:
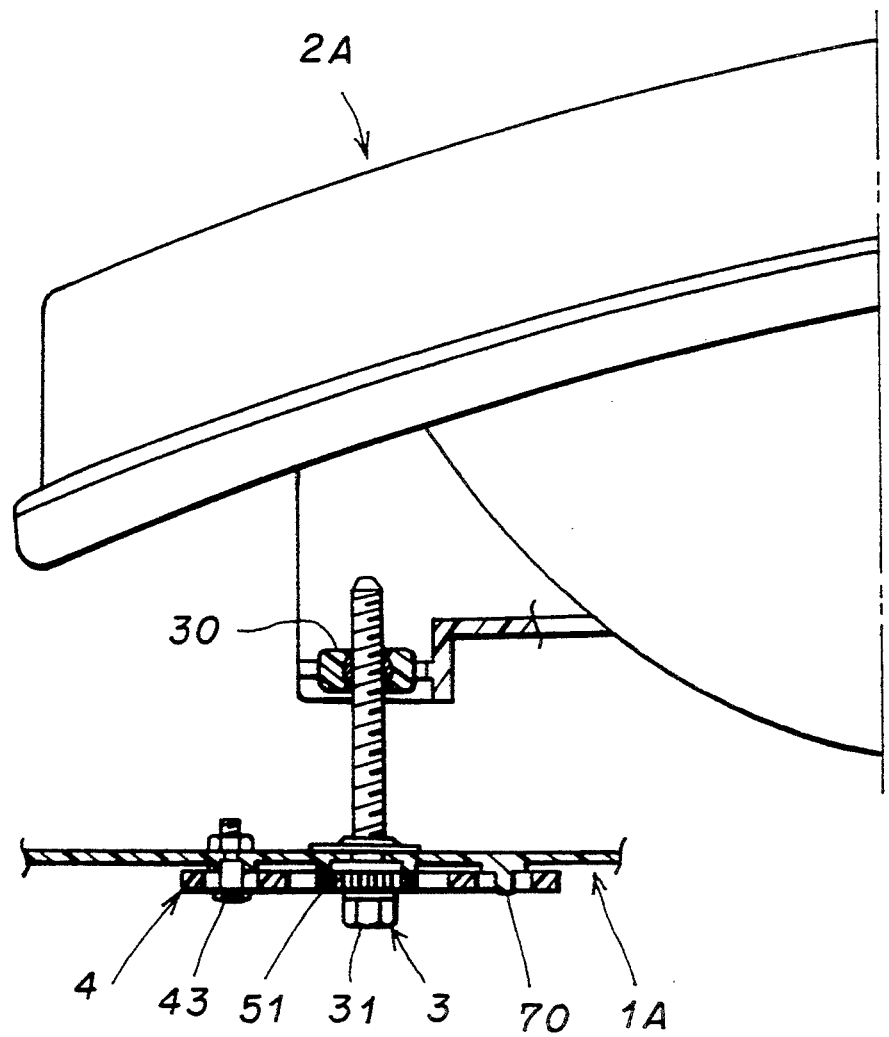
FIG. 17 is a fragmentary plan view of the essential parts of a fourth embodiment of the optical-axis adjustment checker according to the present invention, equipped on a movable-reflector type automotive headlamp.

FIG. 17 shows the fourth embodiment of the optical-axis adjustment checker according to the present invention. In this embodiment, the checker according to the present invention is used with a movable-unit type automotive headlamp. In this Figure, the same elements as in FIGS. 1 through 16 are indicated with the same reference numerals.

The reference numeral 1A indicates a car body on which the checker according to the present invention is to be mounted. The adjusting screw 31 of the optical-axis adjustment checker is installed rotatably but no axially movably through the car body 1A. Also, the plate member 4 of the checker is mounted slidably on the car body 1A with the fixing screw 43, guide pin 70 and so forth.

In Figure, the reference numeral 2A indicates a lamp unit to which the screw mount 30 is fixed unrotatably and not axially movably. The adjusting screw 31 is driven in the screw mount 30.

The optical-axis adjustment checker according to the present invention, used with the movable-unit type headlamp can function similarly to the previously-described one for the movable-reflector type headlamp.

Therefore, it will be apparent to those skilled in the art that the present invention covers the automotive headlamps of both the movable-reflector and movable-unit types.

What is claimed is:

1. In an automotive headlamp having a base member, a to-be-adjusted member pivotably installed on the base member, a lamp bulb provided in the to-be-adjusted member and an optical-axis adjusting mechanism mounted on the to-be-adjusted member and base member and having mounted rotatably but not axially movably on the base member an adjusting screw which is to be turned to adjust the optical axis of the to-be-adjusted member, a device for checking the optical-axis adjustment, having an index and scale marked on the base member and an adjusting screw side, respectively, a deviation between the index and a reference point on the scale being to be read as a measure for necessary optical-axis adjustment, comprising:

a plate member on which the scale on the adjusting screw side is marked;

a means for mounting the plate member on the base member slidably in one direction;

a mechanism for converting a turning of the adjusting screw into a sliding of the plate member; and a means of holding the plate member in such a manner that the turning of the adjusting screw is not transmitted to the plate member via the converting mechanism.

2. A device as set forth in claim 1, wherein the means for mounting the plate member comprises two elongated guide holes formed in the plate member, guide pin formed integrally with the base member and which is to be engaged in one of the guide holes and a fixing screw driven in the base member through the other guide hole, to mount the plate member so as to be slidable longitudinally of the guide holes.

3. A device as set forth in claim 1, wherein the converting means comprises a pinion fixed to the adjusting screw, and a rack formed on the plate member, to convert the turning of the adjusting screw into a sliding of the plate member.

4. A device as set forth in claim 1, wherein the holding means comprises a projection formed on the base member, and a concavity formed in the plate member, to hold the plate member so that the turning of the adjusting screw is not transmitted thereto, when the projection is fitted into the concavity.

5. A device as set forth in claim 2, the holding means comprises a guide pin, concavity formed at the edge of one of the guide holes in the plate member, and a guide recess formed between the concavity and guide hole and which forms a part of a circle taking the fixing screw as a center thereof, to hold the plate member so that the rotation of the adjusting screw is not transmitted to the plate member, when the guide pin is fitted into the concavity.

6. A device as set forth in claim 4, wherein the holding means makes the index on the base member coincide with the reference point on the scale on the plate member when the projection is fitted into the concavity.

7. A device as set forth in claim 5, wherein the holding means makes the index on the base member coincide with the reference point on the scale on the plate member when the guide pin is fitted into the concavity.

8. A device as set forth in claim 1, wherein a crown gear is fixed to the adjusting screw so that the adjusting screw can be turned from a direction generally perpendicular to an axis of the adjusting screw.

9. A device as set forth in claim 1, wherein the scale on the plate member and the index on the base member are visible from a direction generally perpendicular to an axis of the adjusting screw.

* * * * *